Aug. 14, 1945.  K. J. DE JUHASZ  2,382,547
MAXIMUM PRESSURE GAUGE
Filed May 7, 1941
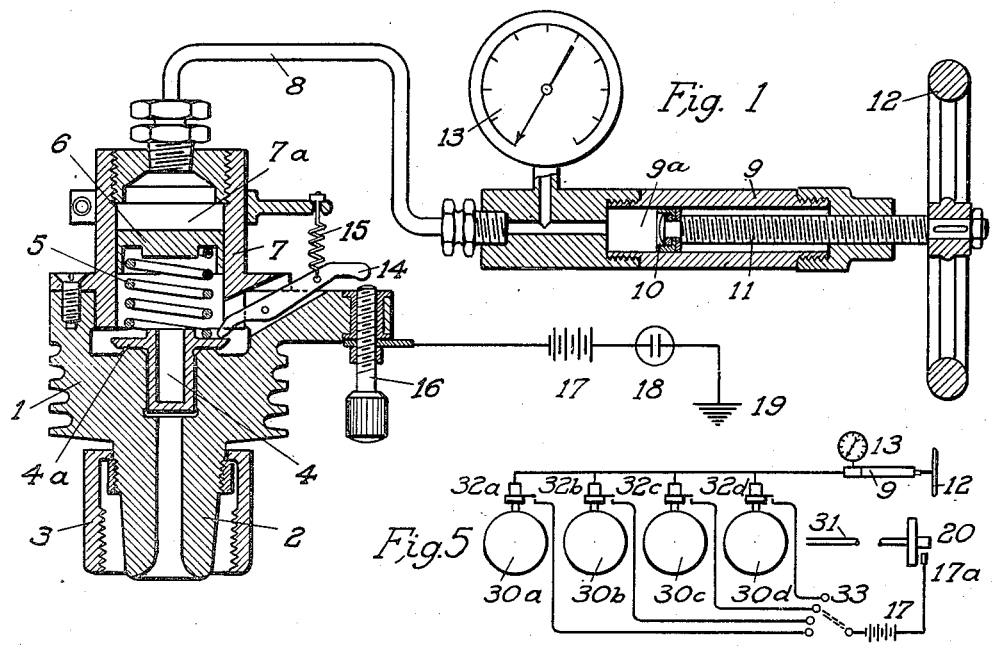
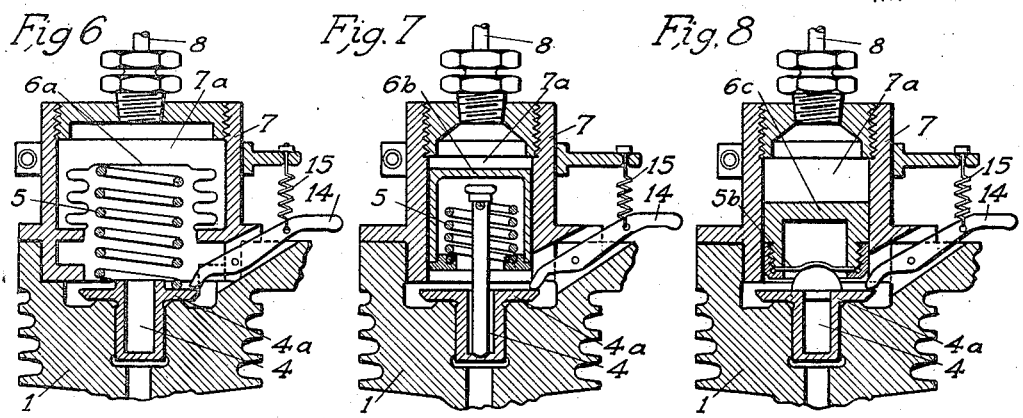
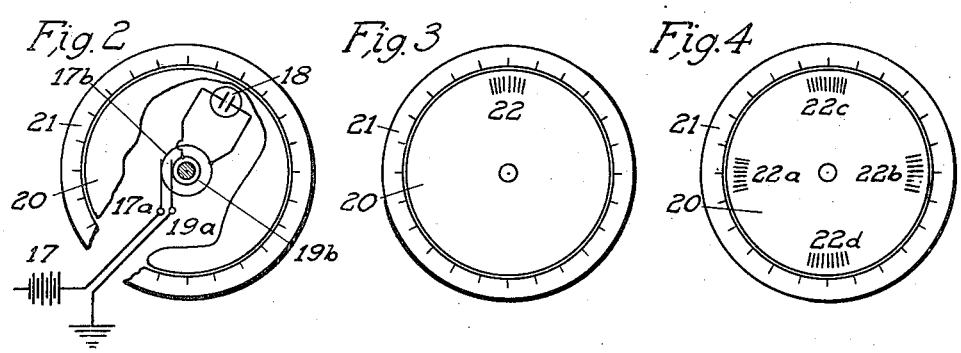
INVENTOR
Kalman John De Juhasz Patented Aug. 14, 1945

2,382,547

UNITED STATES PATENT OFFICE 2,382,547

MAXIMUM PRESSURE GAUGE

Kalman John De Juhasz, State College, Pa.

Application May 7, 1941, Serial No. 392,254

2 Claims. (Cl. 73—388)

My invention relates to improvements in gauges for measuring the maximum value of variable pressures, in particular that of cyclically recurring compression and combustion pressures occurring in cylinders of internal combustion engines, as exemplified by the United States Patents 1,904,747; 1,467,558; 1,950,532; 2,046,801 and 2,240,492.

In the prior art maximum pressure gauges employ a piston movable in a cylinder which is brought into communication with the cyclically varying pressure. The pressure force exerted on the piston is counteracted by a regulable spring force acting on the piston. As long as the spring force is less than the maximum value of the pressure force the piston will move within its limits of motion. In measuring the maximum pressure the spring force is increased until the motion of the piston just ceases which condition is indicated electrically by a piston-operated contactor actuating a signal-lamp preferably of the neon-lamp type. The maximum pressure will be then indicated by the strain, i. e., the lengthening or shortening of the measuring spring which can be read on a scale, micrometer, dial, or counter in terms of pressure units.

While this principle was found usable in practice yet it was found that these instruments are subject to errors due to the variability of the spring rate as a consequence of fatigue and temperature effects.

The object of my invention is to minimize these harmful influences and thus provide a pressure gauge of improved accuracy, and of greater convenience of operation.

The essential feature of my invention is that the spring force transmitted to the piston is, in turn, produced by a fluid pressure which can be measured by a pressure gauge. In virtue of this feature the spring rate, as such, does not enter into the measurement and therefore its calibration, and its variability, have no effect on the accuracy of measurement. A second advantage is that the pressure gauge on which the pressure is read can be located at a distance from the engine cylinder to be tested. A third advantage is the facility by which my maximum pressure gauge lends itself to the measurement of pressures in a number of engine cylinders successively or even simultaneously. A fourth advantage is that not only the magnitude of the maximum pressure but also the engine phase at which it occurs is capable of being indicated which is a valuable information for the equality or non- equality of load-distribution among the several cylinders of a multi-cylindered engine.

My invention is illustrated by the attached drawing in which:

Fig. 1 shows the sectional elevation of the pressure-balancing unit and of the pump and pressure gauge unit, and the schematic arrangement of the neon-lamp circuit;

Fig. 2 shows a modification of the neon-lamp arragement in which the neon-lamp is mounted on a disc which is rotated by the engine shaft;

Fig. 3 shows the view of the rotating neon-lamp as it appears to the observer when the apparatus is being operated;

Fig. 4 shows the view of the rotating neon-lamp when four pressure-balancing units actuate it simultaneously;

Fig. 5 shows the schematic arrangement of the apparatus applied to a four-cylindered engine.

Fig. 6 shows the sectional elevation of a modification of the pressure-balancing unit in which a bellows is used for transmitting the fluid force to the compression spring;

Fig. 7 shows the sectional elevation of a modification of the pressure-balancing unit in which a tension spring is used to transmit the fluid force to the piston;

Fig. 8 shows the sectional elevation of a modification of the pressure-balancing unit in which a diaphragm is used to transmit the fluid force to the piston.

In the embodiment of the invention illustrated in Fig. 1 the barrel I is attached to the engine cylinder to be tested by means of the cone 2 and union nut 3. The piston 4 is a free but airtight fit in the barrel I, and is capable of an axial motion therein. On its under side the piston 4 is exposed to the variable pressure which is to be measured; on its upper surface it is acted upon by the force of the spring 5 which latter can be compressed to a greater or lesser extent by the hydraulic piston 6 movably arranged within the hydraulic cylinder 7. In order to produce the hydraulic pressure a hand-operated hydraulic pump is provided, consisting of the ram 10, cylinder 9, threaded spindle 11 and hand-wheel 12. The space 9a, pipe 8 and space 7a are filled with oil or other suitable liquid the pressure of which is measured by the pressure gauge 13. Thus the liquid pressure determines the compression of the spring 5 and produces a balancing pressure on the piston 4. The pressure gauge 13 is graduated preferably in units of this balancing pressure. It is to be noted that the pipe 8 can be of any convenient length making possible the regulation and observation of the balancing pressure at any convenient location remote from the pressure-balancing unit and from the engine.

Depending on whether the balancing pressure is smaller or greater than the instantaneous value of the variable pressure acting on the piston 4 the latter will tend to move upward or downward, i. e., in the direction of the lesser pressure. The range of motion of the piston 4 is limited to a small amount by means of the piston rim 4a which in the lowermost position of the piston lies on the upper surface of the barrel 1, and in the uppermost position abuts against the lower extension of the hydraulic cylinder 7. The motion of the piston 4 actuates an electric contactor consisting of the lever 14, return-spring 15 and set-screw 16 in the manner shown, making or breaking the electric circuit consisting of the battery 17, neon-lamp 18 and ground 19. The mass of the piston 4, lever 14 and spring 15 are small, in virtue of which the making and breaking of the circuit takes place practically instantaneously, at the instant of the engine cycle at which the variable engine pressure is equal to the balancing pressure as shown on the pressure gauge 13.

In operation, while the engine is running, the operator by turning the handwheel 12 increases or decreases the balancing pressure until the flashes of the neon lamp 18 just disappear or just begin to appear. The pressure shown on the pressure gauge 13 will be then the maximum value of the variable engine pressure.

The phase of the engine cycle at which the maximum pressure occurs can be determined by mounting the neon lamp on a rotating disc 20, Fig. 2, keyed to, or positively driven by the engine shaft. In this case the electric current has to be supplied to the neon lamp 18 through brushes 17a and 19a, and contact rings 17b and 19b. The observer will see a lighted segment, as shown in Fig. 3 by the hatched area 22, signifying the portion of the engine cycle, in terms of crank angle, during which the balancing pressure is exceeded, and the duration of which can be read on the stationary protractor 21. Raising the balancing pressure the length of the lighted segment will decrease until it will finally disappear.

The application of my invention to a four-cylinder engine is shown schematically on Fig. 5 in which 30a, 30b, 30c, 30d represent the four cylinders of the engine, 31 the engine shaft, and 32a, 32b, 32c, 32d the four corresponding complete balancing pressure units mounted on each cylinder. A switch 33 is provided by which the contactor pertaining to each engine cylinder can be made to actuate the neon lamp in turn. Or, in certain cases it may be desirable to short the switch 33 with all the four contact points simultaneously and thereby obtain on the rotating disc four lighted segments as shown by the hatched areas 22a, 22b, 22c, 22d on Fig. 4. In general, these lighted segments will not be of equal length, nor located quite symmetrically around the protractor 21, indicating thereby the fact that the pressure cycles of the several engine cylinders are not uniform. In possession of this information the operator can take suitable corrective measures on the engine in order to bring about the desired uniformity and equality.

The foregoing description and illustrations serve to exemplify the invention, but various modifications of it are possible within the scope of the invention. For example, the pressure-balancing unit may be constructed with bellows 6a as shown in Fig. 6 eliminating thereby the possibility of leakage, and reducing the friction. The spring 5 may be constructed as a spring working in tension working in conjunction with the hydraulic piston 6b as shown in Fig. 7, or, as a spring of other than helical type, such as a diaphragm 5b working in conjunction with the hydraulic piston 6c as shown in Fig. 8. The neon lamp used as a visual indicator can be replaced by a telephone receiver wherever an audible indication is preferable. Instead of using one neon lamp for all the cylinders it is possible to use as many neon lamps as there are cylinders in the multi-cylindered engine. Other modifications of the elements and arrangement of my invention can be made by those skilled in the art without departing from the principle of my invention and from the scope of the appended claims.

What I claim is:

1. A pressure gauge for measuring the extreme value of a fluctuating pressure comprising a body, a pressure-chamber arranged in said body, a pressure-responsive element arranged in said pressure-chamber exposed to said fluctuating pressure and exerting a pressure-force, a spring under load exerting a spring-force on said pressure-element in opposition to said fluctuating pressure, a hydraulic loading device exerting a regulable load on said spring, a gauge indicating said regulable load, and signaling means actuated by said pressure responsive element for indicating when the said fluctuating pressure-force and regulable spring-force are in equilibrium.

2. A pressure gauge for measuring the extreme value of a periodically fluctuating pressure comprising a body, a pressure-chamber arranged in said body, a pressure-responsive element arranged in said pressure-chamber exposed to said fluctuating pressure and exerting a pressure-force, a spring under load exerting a spring-force on said pressure-element in opposition to said fluctuating pressure, a hydraulic loading device exerting a regulable load on said spring, a gauge indicating said regulable hydraulic load, an electric circuit including a make and break device actuated by said pressure responsive element and an electric signal-lamp for indicating when said fluctuating pressure-force and regulable spring-force are in equilibrium, a disc rotatable in synchronism with the period of fluctuation of the pressure to be measured, said signal-lamp being mounted on said disc, a protractor for showing the phases of the periodical pressure-fluctuation in which the fluctuating pressure-force and the regulable spring-force are in equilibrium.

KALMAN JOHN DE JUHASZ.